(12) United States Patent
Kilani et al.

(10) Patent No.: US 6,799,193 B2
(45) Date of Patent: Sep. 28, 2004

(54) FULLY DIGITAL SYMBOL SYNCHRONIZATION TECHNIQUE

(75) Inventors: Mehdi T. Kilani, Westlake Village, CA (US); Hossein Alavi, Woodbridge (CA)

(73) Assignee: Maxim Integrated Products, Inc., Sunnyvale, CA (US)

(*) Notice: Subject to any disclaimer, the term of this patent is extended or adjusted under 35 U.S.C. 154(b) by 0 days.

(21) Appl. No.: 10/022,465

(22) Filed: Dec. 14, 2001

(65) Prior Publication Data

US 2002/0122516 A1 Sep. 5, 2002

Related U.S. Application Data

(60) Provisional application No. 60/255,979, filed on Dec. 15, 2000.

(51) Int. Cl.[7] .............................................. G06F 17/15
(52) U.S. Cl. ..................................................... 708/422
(58) Field of Search ................................ 708/422–426; 375/343, 354–355

(56) References Cited

U.S. PATENT DOCUMENTS 5,428,647 A   6/1995   Rasky et al.
5,898,684 A   4/1999   Currivan et al.

FOREIGN PATENT DOCUMENTS

EP        0782295 A2     7/1997
WO        WO 96/19056    6/1996

OTHER PUBLICATIONS

Broadband Radio Access Networks (BRAN); HIPERLAN Type 2; Physical (PHY) layer, ETSI TS 101 475 V1.1. (2000–04), XP–002199125, p. 23.

Primary Examiner—Tan V. Mai
(74) Attorney, Agent, or Firm—Blakely, Sokoloff, Taylor & Zafman LLP

(57) ABSTRACT

One aspect of the invention provides a novel scheme to synchronize signal reception for a receiver device. In one embodiment, multi-symbol correlation of a first signal and a reference signal is performed. The reference signal corresponds to symbols denoting a synchronization or alignment marker. For every first signal sample, an indication of the degree of similarity between a plurality of the first signal symbols and reference signal symbols is generate as a second signal. This second signal is then nonlinearly processed, linearly processed, and then nonlinearly processed over time to determine if indications of high degrees of correlation occur at periodic intervals. If so, then these are considered synchronization markers and are used to synchronize signal reception of the receiver device.

34 Claims, 5 Drawing Sheets

FULLY DIGITAL SYMBOL SYNCHRONIZATION TECHNIQUE

CROSS REFERENCE TO RELATED APPLICATIONS

This non-provisional U.S. patent application claims the benefit of U.S. Provisional Application No. 60/255,979 filed by inventors Mehdi T. Kilani et al. on Dec. 15, 2000 titled "Fully Digital Symbol Synchronization Technique".

FIELD

The invention relates to the field of communications. In particular, one embodiment of the invention relates to a system and method for extracting symbol timing from preamble symbols of a signal in a reliable, robust and computationally efficient manner.

BACKGROUND

Many modern communication schemes rely on digital information transmissions. Information is digitized and then transmitted via an analog or digital carrier signal.

As illustrated in FIG. 1, a transmitter device 102 typically modulates digitized information into a carrier signal. The transmitter device then transmits the carrier signal on a channel to a receiver device 104 over a transmission medium 106. The receiver device 104 typically demodulates the received carrier signal to extract the digital information found therein.

In typical communication schemes, a receiver device 104 determines where the received digital information begins. Before demodulating a received signal, the receiver device 104 aligns or synchronizes the received signal in order to determine the start of a signal, information, or message and/or to determine whether such signal contains a message. Synchronization permits the device to extract accurate information from the signal.

The synchronization process is sometimes made more difficult when the carrier signal and/or information therein has been corrupted, altered, and/or is more difficult to detect as a result of noise, interference, or some other factor. The transmission medium 106 over which the carrier signal is transmitted is one place where the carrier signal and/or information therein are susceptible to such degradation 108. The transmission medium typically includes wired and/or wireless (air) transmission paths.

Despite the possible degradation of a carrier signal and/or information therein, a receiver device must be able to detect a signal and determine its content in order for communications to occur.

DETAILED DESCRIPTION OF THE INVENTION

Figure 1:
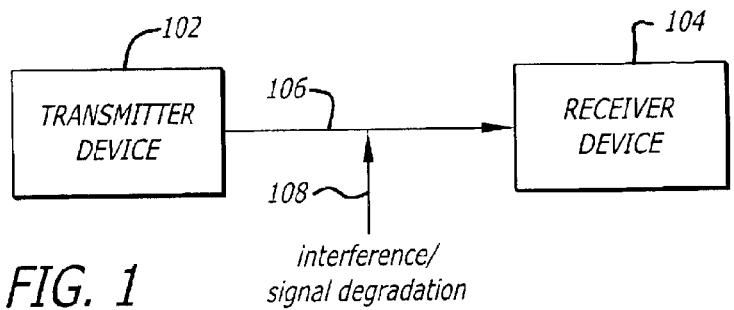
FIG. 1 is a block diagram illustrating one embodiment of a typical communication system.

In the following detailed description of the invention, numerous specific details are set forth in order to provide a thorough understanding of the invention. However, the invention may be practiced without these specific details. In other instances well known methods, procedures, and/or components not have been described in detail so as not to unnecessarily obscure aspects of the invention.

In the following description, certain terminology is used to describe certain features of the invention. For instance, "logic" includes hardware, firmware, software or a combination thereof that performs a certain function on input information. For example, logic may include, but is not limited or restricted to a circuit, electronic device, processor (e.g., a digital signal processor, a microprocessor, a microcontroller, an application specific integrated circuit "ASIC" and the like). The term "information" is defined as voice, data, address, and/or control.

One aspect of the invention provides a system, device, and method for reliable, robust, and computationally efficient extraction of symbol timing (synchronization). In one embodiment, synchronization symbols are transmitted periodically from a transmitter device to a receiver device (at least until the receiver device has been synchronized). The receiver device attempts to detect the synchronization symbols by comparing samples from the received signal to a reference set of synchronization symbols. If synchronization symbols are detected at expected intervals, then the receiver device synchronizes itself based on the occurrence of these symbols.

In one implementation, symbol synchronization is performed by correlating preamble symbols of a received signal to stored reference symbols. A subset of the symbols, rather than the full set of symbols may be correlated for faster processing. The resulting signal is then passed through a memoryless nonlinear signal processor followed by an amplitude-based linear filter. The resulting signal is nonlinearly processed over time to determine if the preamble symbols have been detected.

The term "symbol" is generally defined as one or more samples of information associated with the message. For instance, a symbol may be represented as a magnitude and/or phase-shifted point or vector in a signal.

Signal symbols or samples may be used for a variety of purposes. In one implementation, symbols may be employed to synchronize information transmitted over different communication channels. In another implementation, symbols may be employed to synchronize a receiver device to more accurately demodulate the received signal.

Symbols may be embodied in a preamble of a message or within the data segment or block. The "preamble" is generally defined as an introductory portion of the message Referring to FIG. 2, a block diagram illustrating an exemplary synchronizer 200 according to one embodiment of the invention is shown. The synchronizer 200 includes a correlator 210, including logic to compute the correlation between a received signal and a reference signal. Both the received signal and reference signal include initialization or preamble symbols, which may be included at a beginning portion of the signal information. As an example, in the case of Orthogonal Frequency-Division Multiplexing (OFDM) modulation scheme, the preamble symbols include a chirp or a pseudo noise signal with or without cyclic prefix. The correlator 210 provides indication (e.g. symbol) as it output corresponding degree of similarity between the compared symbols.

In one embodiment, the correlator 210 performs a dot product operation 240 (the sum of products between corresponding elements of two matrices or vectors) between a vector containing received signal symbols 220 and a pre-stored vector containing reference symbols 230. The received vector 120 includes received signal symbols that are shifted into a serial-in/parallel-out (S/P) shift register 220. Upon the arrival of each sample, the content of the shift register 220 is multiplied by a pre-stored reference sample vector 230 and the resulting values are added together in accordance with a dot product operation 240. The result of the dot product operation is then provided as the output of the correlator 210. The signal employed as a basis for the reference sample vector is a replica of the transmitted preamble symbol.

The output 242 from the correlator 210 is then passed through a nonlinear memoryless circuit or logic 250. The nonlinear memoryless circuit or device 250 performs one or more nonlinear operations on a current data sample without reliance on prior vector or data samples. The nonlinear operation is intended to magnify spikes/peaks and/or troughs in the correlated signal by a disproportionate amount. Thus, the nonlinear operation may be performed by square:, absolute value, logarithmic/exponential, and/or other nonlinear functions.

The output 252 of the nonlinear logic 250 serves as input to a linear filter 260. The linear filter 260 serves as a matched filter to the preamble signal that may have experienced the effects of the correlator 210 and/or other nonlinear memoryless circuit blocks. In one embodiment, filter 260 is a FIR filter whose coefficients ($w_i$) are obtained by passing a noise free preamble signal through the correlator 210 and the nonlinear memoryless circuit 250. In this manner the signal may be enhanced and the signal to noise ratio is improved.

The signal is then passed through a threshold detector 280 based on amplitude, allowing signal points/samples with amplitudes greater than a threshold level to pass and filtering signal points/samples with amplitudes below the threshold level. In this manner, the threshold detector 280 cleans the signal, removing low amplitude samples to more clearly show the signal samples of interest. Thus, the nonlinear circuit 250 together with the linear filter 260 and the threshold detector 280 makes the peaks at the output 242 of the correlator 210 sharper and more distinguishable at output 282.

The output 282 of the threshold detector 280 provides an input to a nonlinear processing logic 270. In one implementation, the nonlinear processing logic 270 processes the signal 262 to provide an averaged estimate for the sample time associated with the peaks in successive symbols. That is, the nonlinear processing logic 270 ascertains the time between the signal peaks calculates an average time from peak to peak.

In order to make a time domain correlation-based synchronization technique robust and reliable in frequency selective and time varying channels, further signal processing techniques such as integration and linear/nonlinear filtering may be employed without departing from the invention. The proposed system is very robust in situations where the dynamic range of the signal is large within each preamble symbol period.

Figure 3:
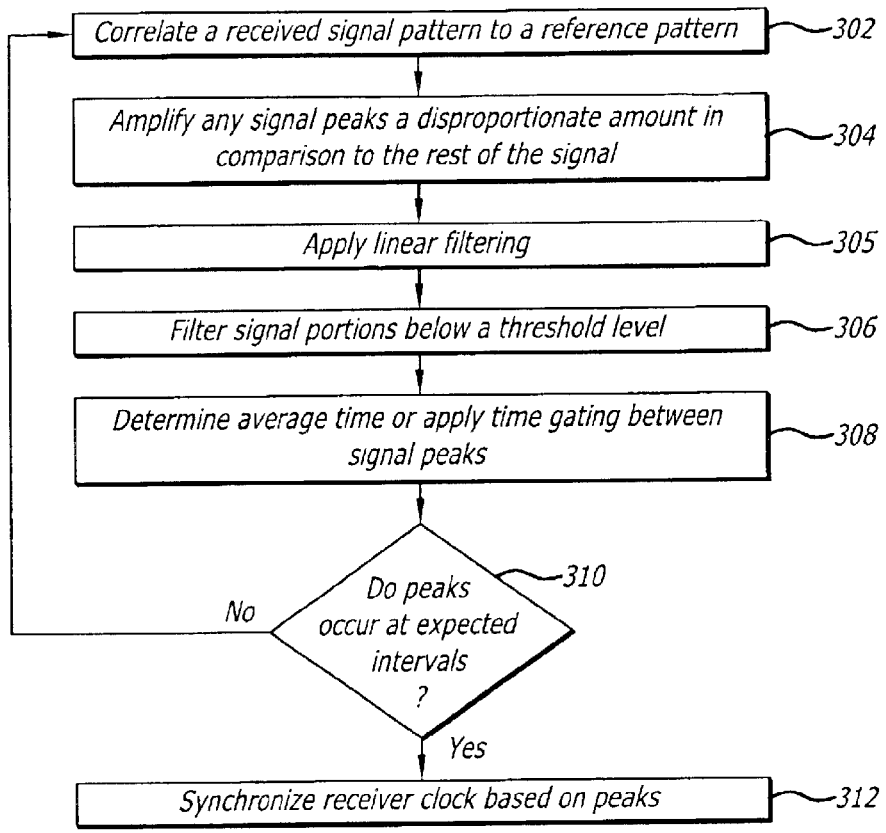
FIG. 3 is a flow diagram illustrating an exemplary method of performing signal synchronization according to one embodiment of the invention.

FIG. 3 illustrates an exemplary method of performing the signal synchronization invention. A received signal includes a pre-amble or synchronization marker/portion. A received signal pattern (e.g. samples/symbols) is correlated to a reference signal pattern (e.g. samples/symbols) 302. The correlation generates an output signal which is an indication of the degree of similarity between the received signal pattern and reference signal pattern. In one embodiment, the reference signal pattern corresponds to the desired synchronization marker or samples. If there is a high degree of correlation between the signal patterns, then peaks are generated as the output.

Any output signal peaks are then amplified a disproportionate amount in comparison to the rest of the output signal 304. The output signal is linearly filtered to enhance the signal thus increasing the signal to noise ratio 305. The output samples of the filter below a threshold level are filtered 306. The threshold level is chosen to filter out noise and undesirable output signal portions.

The average time between output signal peaks is then calculated 308. This average time is employed to determine if peaks occur at an expected interval (e.g. employ a gating schemed, etc) 310. If the peaks occur at a regular interval, then they can be used to synchronize a clock (e.g. receiver clock) 312. Otherwise, correlation continues until synchronization occurs.

Figure 4:
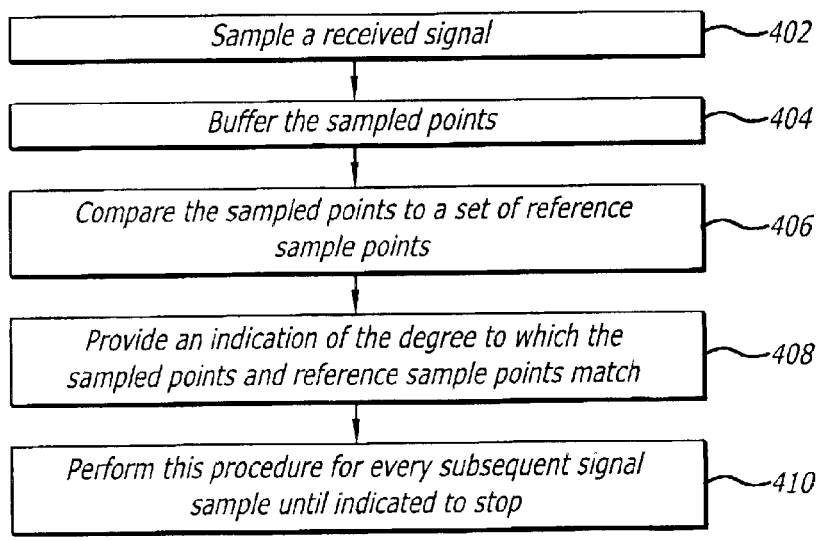
FIG. 4 is a flow diagram illustrating an exemplary method of performing signal correlation according to one aspect of the invention.

Referring to FIG. 4, an exemplary method of performing correlation is illustrated. Correlation may be performed by comparing the received signal to a reference signal. As a signal is received 402, it is periodically sampled. Each signal sample provides a symbol (e.g. magnitude, phase, etc.) which is buffered or stored 404. In one implementation, the received symbols are buffered in sequential order (e.g. in the order received). A plurality of the received symbols are then compared to corresponding symbols of the reference signal 406. The reference signal may be represented as a pre-determined reference symbol pattern. The reference symbol pattern is a plurality of samples representing the desired initialization or synchronization preamble or marker.

An indication of the degree of similarity between the corresponding symbols in the received signal and reference signal is then generated 408. This degree of similarity may be represented by a single symbol (e.g. magnitude, phase, etc.). Thus, for every newly received signal sample, one or more correlation indicator symbols are generated. This continues until synchronization is achieved 410.

In one implementation, the higher the degree of similarity between a set of received signal samples and reference symbols the higher the correlation value (e.g. signal magnitude) generated. A correlation scheme may generate signal 'peaks' when there is a high degree of similarity or correlation. Since synchronization symbols are periodically transmitted by the transmitter device, these peaks at should also occur periodically (e.g. at substantially the same period as the synchronization symbols generated by the transmitter). By recognizing the periodic nature of these peaks, the receiver device can establish a synchronization period. That is, the receiver device may synchronize itself by triggering or aligning its own clock from the one of these peaks.

Figure 5:
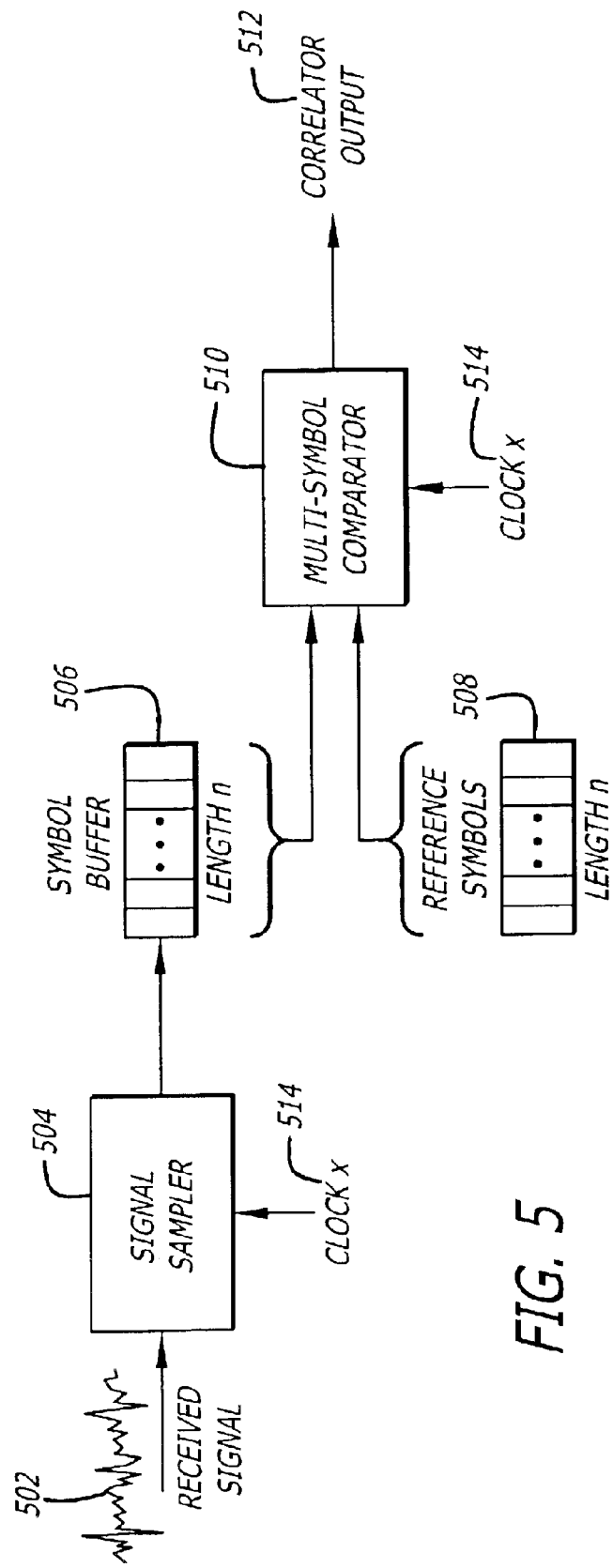
FIG. 5 is a block diagram illustrating a correlator according to one embodiment of the invention.

FIG. 5 is a block diagram illustrating a correlator according to one embodiment of the invention. As previously described, the received signal 502 may be sampled by a signal sampler 504 to provide one symbol per sampling clock cycle. Each symbol is sequentially stored in an n-length symbol buffer 506. The symbol buffer 506 operates as a shift register. One or more of the symbols in the symbol register 506 are then compared to corresponding reference symbols in a reference buffer 508 by a multi-symbol comparator 510. The multi-symbol comparator 510 provides an output 512 which is an indication (e.g. a symbol) of the degree of similarity between the compared symbols. In one implementation, both the signal sampler 504 and multi-symbol comparator 510 provide a symbol at the same clock frequency 514.

The frequency with which the received signal is sampled will depend on the implementation requirements. Generally, a higher frequency of samples provides better synchronization performance. According to one implementation, the number of signal samples on which correlation (e.g. dot product operation) is performed may vary. A larger number of samples provide more accurate correlation and synchronization but require greater processing complexity and resources. On the other hand, a smaller number of samples simplifies processing and consume less resources but is less accurate and/or may take longer to synchronize.

Figure 6:
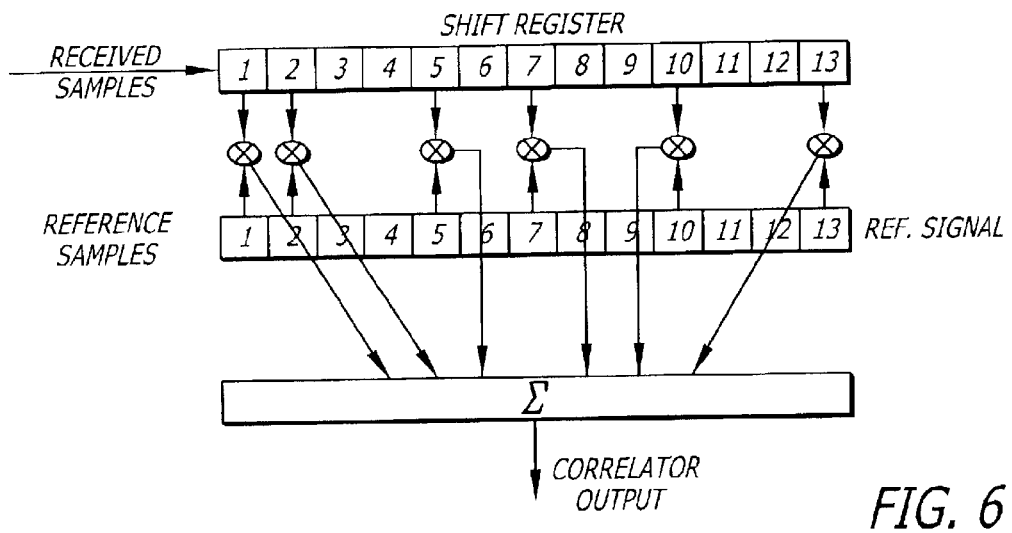
FIG. 6 is a block diagram illustrating how a subset of the samples can be correlated to perform synchronization according to one aspect of the invention.

Additionally, according to one aspect of the invention, a subset of the available signal samples and reference samples may be employed to perform the correlation. The samples on which the correlation (e.g. dot product operation) is performed, can be equally or unequally spaced in time. For example, in FIG. 6 a reference signal with thirteen samples is shown. However, the correlation is computed using only six samples out of the thirteen samples. In particular, samples 1, 2, 5, 7, 10, and 13 are employed in the dot product operation. For a dot product correlator, the implementation complexity of the correlator is significantly reduced by reducing the number of multiplication operations.

According to one aspect of the invention, correlation is performed on the signs of the input information (received signal samples) and reference samples. Sign-based correlation provides several advantages. First, the synchronizer becomes less sensitive to the dynamic range of the signal. This is especially important when the channel of a wideband signal suffers from severe frequency-selective fading. For example, if a chirp signal is selected as a preamble symbol, its amplitude may experience a large variation within the symbol period. This is due to the fact that the channel may exhibit several deep fades within the whole frequency band. Also during the Automatic Gain Control (AGC) adaptation procedure when the amplitude of the preamble symbols is still too small or too large and the optimum gain has not been accomplished yet, the system will be able to achieve synchronization. In other words, the sign-based approach makes the proposed technique applicable even during the AGC adaptation period and provides faster acquisition for synchronization.

Secondly, by using sign-based correlation the implementation complexity dramatically reduces as the correlator can be implemented without multiplications and all the processing can be realized in fixed point/integer arithmetic.

Thirdly, in those implementations where the memoryless, nonlinear logic 250 (FIG. 2) performs an absolute value function, the absolute value function makes the logic 250 insensitive to the polarity of the incoming signal. The type of nonlinear function is selected according to the nature of the communication channel and the preamble signal.

Figure 2:
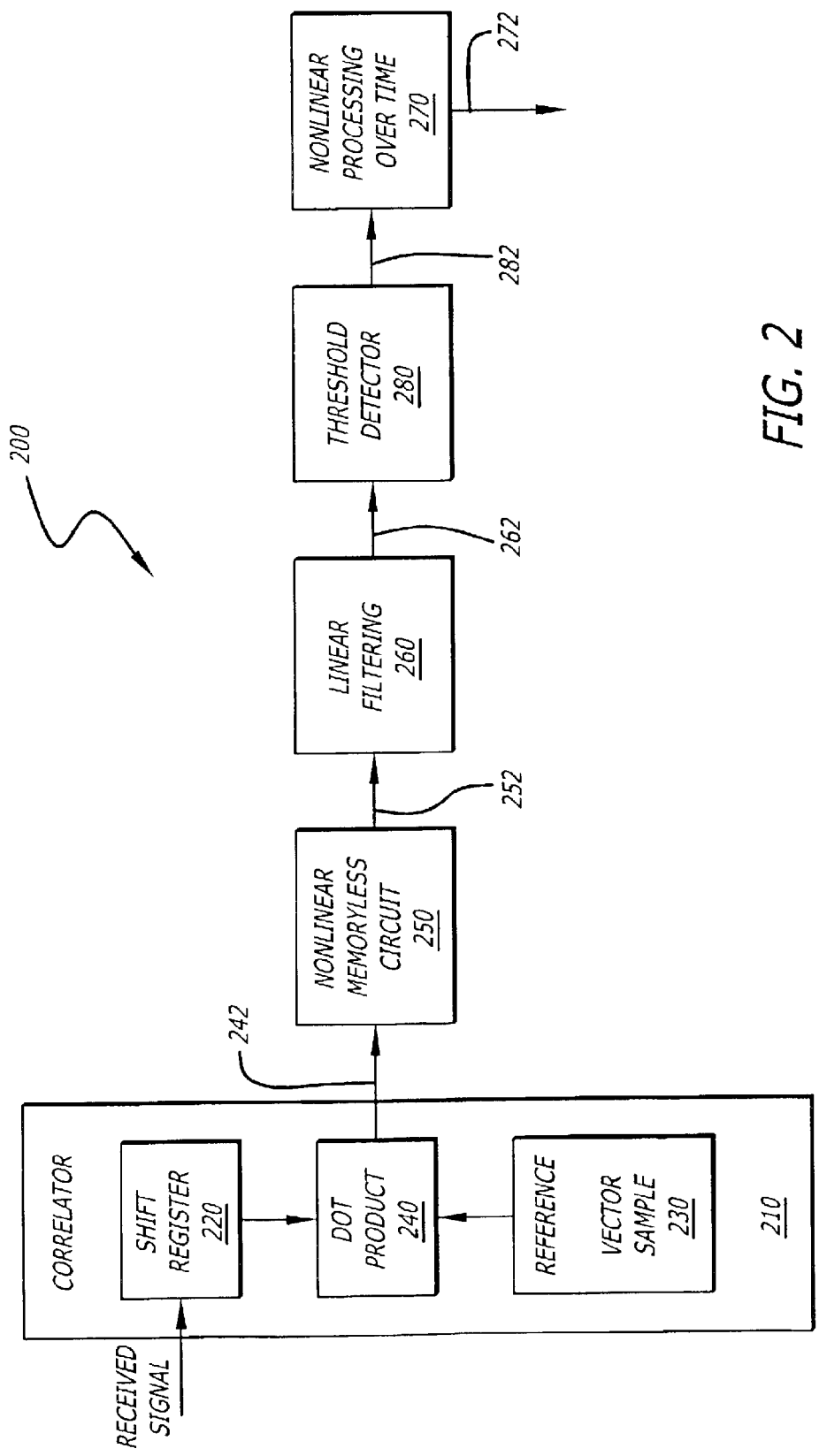
FIG. 2 is a block diagram illustrating an exemplary synchronizer according to one embodiment of the invention.

According to another implementation, various other linear filters may be employed as part of the synchronizer 200 (FIG. 2). For instance, a low pass filter in the form of infinite impulse response (IIR) may be applied to the signal samples at the output of the nonlinear logic 250 (FIG. 2). The filter coefficients are obtained in such a way that the filter frequency response is matched to the input signal spectrum to improve delectability and reduce the timing jitter.

Figure 7:
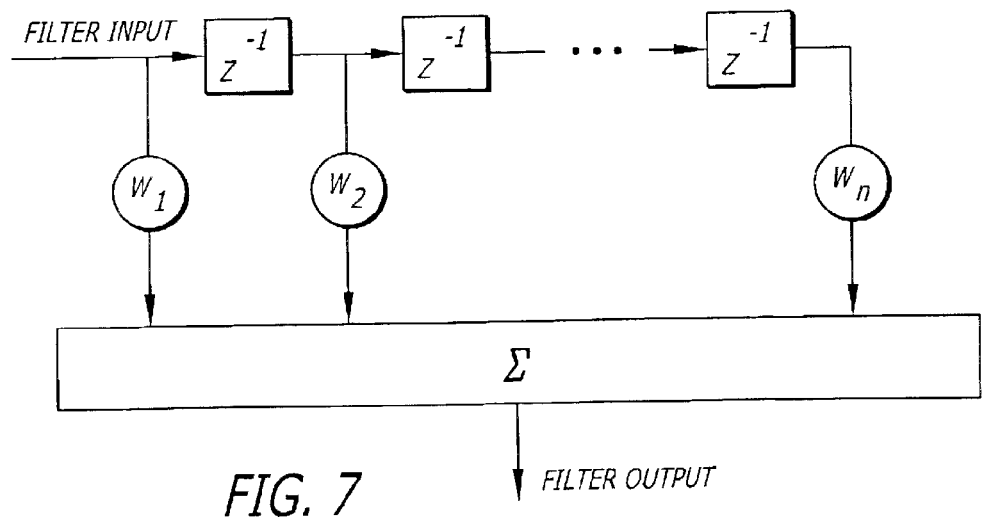
FIG. 7 is a block diagram of a Linear Finite Impulse Response (FIR) filter as may be employed in one embodiment of a synchronizer according to aspect of the invention.

In one embodiment shown in FIG. 7, the linear filter 260 (FIG. 2) may be a moving average filter ($w_i$=1). Said moving average filter serves to reduce the effect of noise on signal samples.

The nonlinear processing logic 270 (FIG. 2) plays an important role in the proposed technique. It provides additional flexibility for reducing the false alarm rate (erroneous peak detections, peaks which do not represent synchronization preambles) while maintaining the same missed detection rate (the failure to detect valid peaks representing synchronization preambles). In some communication systems, several predefined symbols are used for the preamble signal. Therefore, the signal at the output of threshold detector 280, shows several successive peaks. These peaks are approximately equally spaced in the time domain and may only have a small displacement in time (jitter) because of various noise sources in the receiver. Therefore, by means of averaging over time, a better estimate for symbol timing may be obtained. Additionally, a gating mechanism may be used to narrow the search for the peaks to a short time window at which the signal sample peaks are expected to occur. This reduces the probability of false or erroneous detections and increases the accuracy of synchronization.

FIGS. 8 through 13 are graphs illustrating how an exemplary sample pattern may be processed by a synchronizer according one embodiment of the invention.

Figure 8:
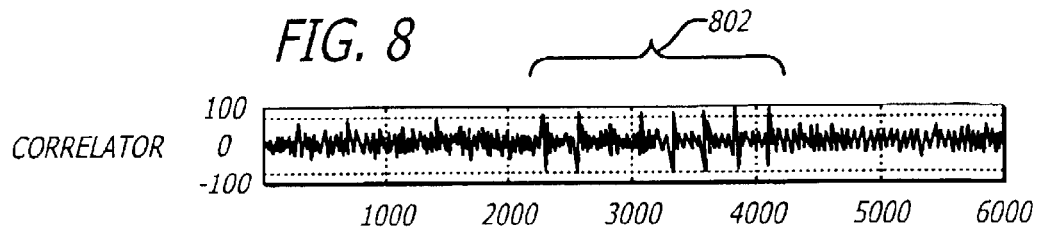
FIGS. 8–10 are graphs illustrating how an exemplary signal is processed by one embodiment of the synchronizer.

FIG. 8 illustrates a signal generated by a correlator. This signal is indicative of the similarity between an input signal and reference signal (corresponding to a desired synchronization symbol pattern). Eight points of high correlation 802 (peaks) can be made out in the noisy signal.

Figure 9:
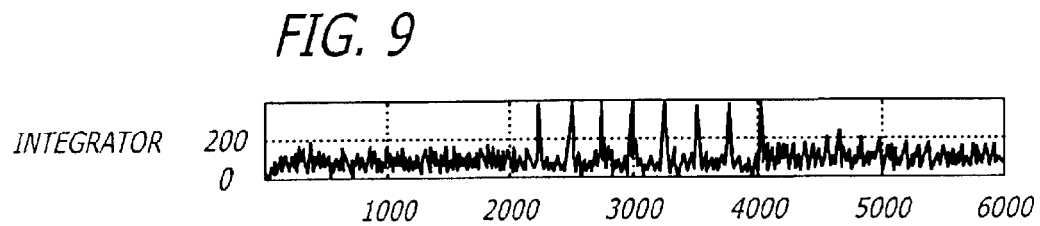

FIG. 9 illustrates how the signal shown in FIG. 8 appears after having passed through a nonlinear circuit and linear filter. For instance, the signal of FIG. 8 may have passed through an absolute value converter and a moving average filter to more clearly show the points of high correlation. In another embodiment, a signal integrator may have been employed to more clearly distinguish the eight peaks from the rest of the signal.

Figure 10:
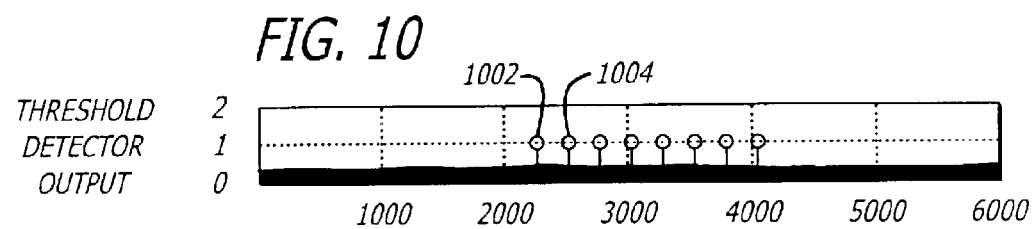
Figure 11:
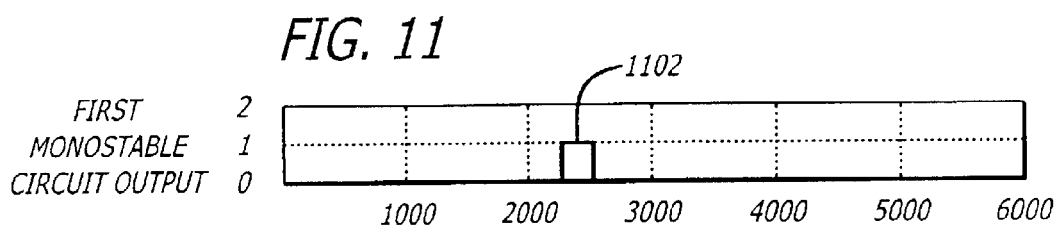
FIGS. 11–13 are graphs illustrating various exemplary signals that may be generated by a synchronizer according to one embodiment of the invention to synchronize a receiver.

FIG. 10 illustrates how the signal in FIG. 9 appears after having passed through a threshold detector. The threshold detector filters out the signal points below a particular level. The signal may be further processed to generate a bi-level signal of either a Low (e.g. zero volts) or a High (e.g. 1 volt) value. Thus, the peaks appear as spikes.

Upon detection of a first peak 1002, a first monostable circuit starts a detection period 1102 (FIG. 11) during which the first monostable circuit attempts to open the time gate within which to search for the next peak 1004.

Figure 12:
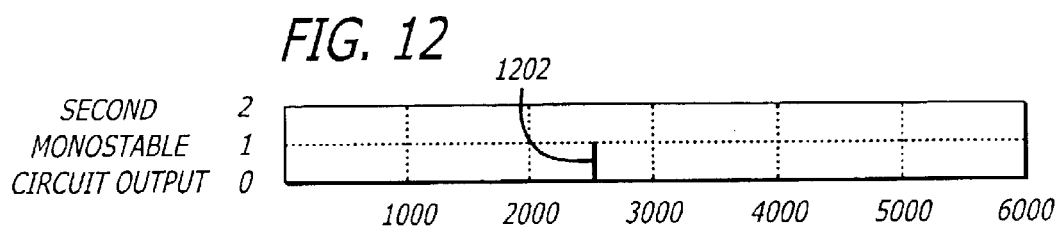

This gating scheme may be employed to minimize erroneous readings from spurious peaks. A second monostable circuit, activated by the negative edge of the output pulse of the first monostable circuit, generates a fine-tuning window 1202 (FIG. 12). In other words, once the first peak is observed, it activates the first monostable. The output of the first monostable circuit opens the time gate for a specific time period at which the second peak is expected to appear. The time window duration is controlled by the durations of both the first and second monostable circuit outputs. By narrowing the detection period 1202 of the second monostable circuit about the expected detection point, erroneous readings may be minimized. In one embodiment, the fine-tuning window 1202 may be generated based on a pre-configured period known to the circuit. That is, based on the known peak-to-peak period, the first detected peak 1002 may be employed to approximately determine the next peak 1004. In another embodiment, the approximate peak-to-peak period may be determined by calculating the average time between previously detected peaks.

Figure 13:
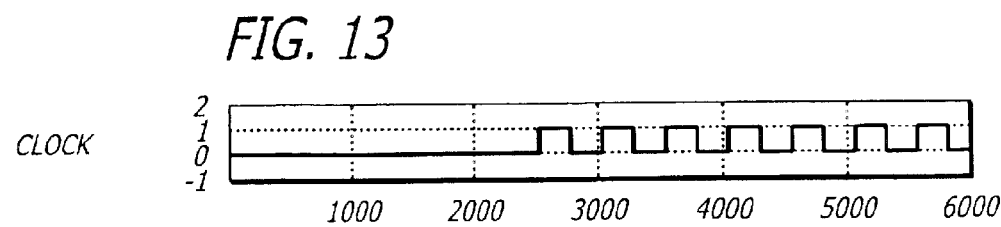

If during the expected fine-tuning window 1202, a second peak is detected, this can be used by a synchronizer to start a receiver device's clock as shown in FIG. 13.

Various detection techniques may be employed by the nonlinear processing logic to improve the accuracy of synchronization. For example, a gating strategy may be implemented at the nonlinear processing logic 270 (FIG. 2). In one embodiment, once the first symbol associated with the first detected peak is detected, a gating mechanism becomes active. That is, the logic 270 (FIG. 2) seeks to detect the next peak in a short period of time when we expect to have the second peak. The logic can be implemented by nonretriggerable monostable oscillators.

Various aspects of the invention may be employed as part of a wired and/or wireless communication scheme (e.g. point to point, network, etc.).

While certain exemplary embodiments have been described and shown in the accompanying drawings, it is to be understood that such embodiments are merely illustrative of and not restrictive on the broad invention, and that this invention not be limited to the specific constructions and arrangements shown and described. Additionally, it is possible to implement the invention or some of its features in hardware, programmable devices, firmware, software or a combination thereof. The invention or parts of the invention may also be embodied in a processor readable storage medium or machine-readable medium such as a magnetic, optical, or semiconductor storage medium.

What is claimed is:

1. An apparatus comprising:
   a correlator, the correlator to receive a first signal, correlate the first signal to a reference signal, and provide a second signal indicative of the correlation result;
   a nonlinear circuit coupled to the correlator, the nonlinear circuit to perform a nonlinear operation on the second signal to amplify signal peaks in the second signal by a disproportionate amount in comparison to the rest of the second signal;
   a filter coupled to the nonlinear circuit, the filter to enhance the signal peaks in the amplified second signal; and
   a signal processor coupled to the filter, the signal processor configured to determine if any signal peaks in the enhanced, amplified second signal correspond to synchronization markers.

2. The apparatus of claim 1 wherein the correlator includes,
   a sampling device to periodically sample the first signal,
   a buffer to store the first signal samples, and
   a data store to store pre-determined signal samples corresponding to the reference signal.

3. The apparatus of claim 2 wherein the correlator is configured to perform a dot product operation on the first signal samples and reference signal samples.

4. The apparatus of claim 2 wherein only a subset of the first signal samples and reference samples are employed to perform the correlation.

5. The apparatus of claim 4 wherein the samples within the subset are equally spaced in time.

6. The apparatus of claim 4, wherein the samples within the subset are unequally spaced in time.

7. The apparatus of claim 1 wherein the correlator generates peaks when there is a high degree of correlation between the first signal and reference signal.

8. The apparatus of claim 1 further comprising a threshold detector coupled to the filter, the threshold detector to remove portions of the enhanced, amplified second signal below a threshold amplitude level.

9. The apparatus of claim 1 wherein the signal processor employs a gating scheme to more accurately determine if the first signal corresponds to the synchronization marker.

10. The apparatus of claim 1 wherein the signal processor is configured to synchronize a clock upon the detection of the synchronization marker.

11. A system comprising:
    means for correlating a first signal to a reference signal and provide a second signal indicative of the degree of similarity between the first signal and the reference signal;
    means for disproportionately amplifying peaks in the second signal by performing a nonlinear operation on the second signal;
    a means for linear filtering the amplified second signal below a certain threshold level; and
    a means for determining if any signal peaks correspond to a synchronization marker.

12. The system of claim 11 wherein the means to correlate the first signal to the reference signal includes
    means for sampling the first signal,
    means for buffering the first signal samples, and
    means for storing pre-determined reference signal samples corresponding to the reference signal.

13. The system of claim 12 wherein only a subset of the first signal samples and reference samples are employed to perform the correlation.

14. The system of claim 13, wherein the samples within the subset are unequally spaced in time.

15. The system of claim 11 wherein the means for correlating generates peaks when there is a high degree of correlation between the first signal and reference signal.

16. The system of claim 11 wherein the means for determining if any signal peaks correspond to a synchronization marker employs a gating scheme to more accurately determine if the first signal corresponds to the synchronization marker.

17. A method comprising:
    correlating samples from a first signal to samples from a reference signal;
    generating a second signal including indications of the degree of similarity between the first signal samples and reference signal samples;
    amplifying, according to one of a logarithmic function and an exponential function, any indications of a high degree of similarity in the second signal a disproportionate amount in comparison to the rest of the second signal;
    filtering portions of the amplified second signal below a threshold level; and
    determining if two or more indications of a high degree of similarity in the filtered, amplified second signal occur at periodic time intervals and, if so, synchronizing a clock based on these periodic indications.

18. The method of claim 17 wherein the indication of the degree of similarity is generated based on N previous samples from the first signal, where N is a positive integer.

19. The method of claim 18 wherein the indication of the degree of similarity is generated based on L previous samples of the first signal, where L is a positive integer less than N.

20. The method of claim 19 wherein the indication of the degree of similarity is generated based on the L previous samples of the first signal, where the L samples are unequally spaced in time.

21. The method of claim 17 further comprising:
periodically sampling the first signal to obtain a plurality of sample values.

22. The method of claim 17 wherein for every sample of the first signal an indication of the degree of similarity between a plurality of first signal samples and reference signal samples is generated.

23. The method of claim 17 wherein correlating samples from the first signal to the reference samples includes performing a dot product operation between a first matrix containing samples from the first signal and a second matrix containing the reference samples.

24. The method of claim 17 wherein the indication of the degree of similarity is a signal symbol.

25. The method of claim 24 wherein generating the indication of the degree of similarity, the higher the degree of similarity the higher the magnitude of the signal symbol generated.

26. The method of claim 17 wherein a gating scheme is employed to determine if the two or more indications of a high degree of similarity in the filtered, amplified second signal occur at periodic time intervals.

27. A machine-readable medium having one or more instructions for synchronizing a received signal, which when executed by a processor, causes the processor to perform operations comprising:
correlating samples from a first signal to reference samples;
generating a second signal including indications of the degree of similarity between the first signal samples and reference signal samples;
amplifying, according to one of a logarithmic function and an exponential function, any indications of a high degree of similarity in the second signal a disproportionate amount in comparison to the rest of the second signal;
filtering portions of the amplified second signal below a threshold level; and
determining if two or more indications of a high degree of similarity in the filtered, amplified second signal occur at periodic time intervals and, if so, synchronizing a clock based on these periodic indications.

28. The machine-readable medium of claim 27 wherein the indication of the degree of similarity is generated based on N previous samples from the first signal, where N is a positive integer.

29. The machine-readable medium of claim 28 wherein the indication of the degree of similarity is generated based on L previous samples of the first signal, where L is a positive integer less than N.

30. The machine-readable medium of claim 29 wherein the indication of the degree of similarity is generated based on the L previous samples of the first signal, where the L samples are unequally spaced in time.

31. The machine-readable medium of claim 27 further comprising:
periodically sampling the first signal to obtain a plurality of sample values.

32. The machine-readable medium of claim 27 wherein for every sample of the first signal an indication of the degree of similarity between a plurality of first signal samples and reference signal samples is generated.

33. An apparatus comprising:
a correlator to receive a first signal, correlate the first signal to a reference signal, and provide a second signal indicative of a result of a correlation of the first signal to the reference signal, the correlator comprising
a sampling device to periodically sample the first signal,
a buffer to store samples of the first signal, and
a data store to store pre-determined signal samples corresponding to the reference signal,
wherein only a subset of the first signal samples and the reference signal samples are used to perform the correlation and the first signal samples within the subset are unequally spaced in time;
a nonlinear circuit in communication with the correlator, the nonlinear circuit to amplify signal peaks in the second signal by a disproportionate amount in comparison to the rest of the second signal;
a signal filter in communication with the nonlinear circuit, the signal filter to further enhance the signal peaks in the amplified second signal prior to filtering the enhanced, amplified second signal below a threshold level; and
a signal processor in communication with the signal filter, the signal processor configured to determine if any signal peaks in the filtered, amplified second signal correspond to synchronization markers.

34. A system comprising:
means for correlating a subset of samples of a first signal, the samples within the subset being unequally spaced in time, to predetermined samples of a reference signal and providing a second signal indicative of the degree of similarity between the first signal and the reference signal, the means for correlating comprising
means for sampling the first signal,
means for buffering the samples of the first signal, and
means for storing the pre-determined samples of the reference signal;
means for processing the second signal to disproportionately amplify peaks in the second signal;
means for filtering the second signal to further enhance the amplified peaks in the second signal prior to filtering the enhanced, amplified second signal below a certain threshold level; and
means for determining if any signal peaks correspond to a synchronization marker.

* * * * *